US011875586B2

(12) United States Patent
Balkanski et al.

(10) Patent No.: US 11,875,586 B2
(45) Date of Patent: Jan. 16, 2024

(54) DETECTION AND MITIGATION OF CYBER ATTACKS ON BINARY IMAGE RECOGNITION SYSTEMS

(71) Applicant: Robust Intelligence, Inc., San Francisco, CA (US)

(72) Inventors: Eric Balkanski, New York, NY (US); Harrison Chase, San Francisco, CA (US); Kojin Oshiba, San Francisco, CA (US); Alexander Rilee, Cambridge, MA (US); Yaron Singer, Menlo Park, CA (US); Richard Wang, West Hills, CA (US)

(73) Assignee: ROBUST INTELLIGENCE, INC., San Francisco, CA (US)

( * ) Notice: Subject to any disclaimer, the term of this patent is extended or adjusted under 35 U.S.C. 154(b) by 123 days.

(21) Appl. No.: 17/168,547

(22) Filed: Feb. 5, 2021

(65) Prior Publication Data
US 2021/0248241 A1    Aug. 12, 2021

Related U.S. Application Data

(60) Provisional application No. 62/971,021, filed on Feb. 6, 2020.

(51) Int. Cl.
*G06F 21/57*     (2013.01)
*G06F 18/2433*   (2023.01)
(Continued)

(52) U.S. Cl.
CPC .......... *G06V 30/40* (2022.01); *G06F 18/2433* (2023.01); *G06F 21/577* (2013.01);
(Continued)

(58) Field of Classification Search
CPC ............. G06F 21/577; G06F 2221/034; G06F 18/2433; G06N 20/00; G06K 9/6284;
(Continued)

(56) References Cited

U.S. PATENT DOCUMENTS

2007/0143158 A1*   6/2007   Cordery ............... G06V 30/158
                                                        382/112
2017/0287252 A1    10/2017  Laddah et al.
(Continued)

OTHER PUBLICATIONS

Grosse et al., "On the (Statistical) Detection of Adversarial Examples," arXiv preprint arXiv:1702.06280, 2017, p. 1-13 (Year: 2017).*
(Continued)

*Primary Examiner* — Peter C Shaw
*Assistant Examiner* — Zhe Liu
(74) *Attorney, Agent, or Firm* — Orrick, Herrington & Sutcliffe LLP

(57) ABSTRACT

A computer-implemented method, comprising receiving, by a computer system, binary image data, the computer system configured to detect a pixel value in the binary image data to represent a non-machine language value related to the binary image data; determining, by the computer system, that the binary image data further comprises at least a pixel value that is altered in a manner to change the non-machine language value related to the binary image data when read by an image recognition system; and alerting, by the computer system, to the image recognition system to review the binary image data.

14 Claims, 13 Drawing Sheets

(51) Int. Cl.
- *G06V 30/40* (2022.01)
- *G06N 20/00* (2019.01)
- *G06V 30/20* (2022.01)
- *G06V 10/74* (2022.01)
- *G06V 30/10* (2022.01)

(52) U.S. Cl.
CPC ........... *G06N 20/00* (2019.01); *G06V 10/761* (2022.01); *G06V 30/20* (2022.01); *G06F 2221/034* (2013.01); *G06V 30/10* (2022.01)

(58) Field of Classification Search
CPC ........ G06V 30/10; G06V 30/40; G06V 30/20; G06V 10/761
See application file for complete search history.

(56) References Cited

U.S. PATENT DOCUMENTS

| | | | | |
|---|---|---|---|---|
| 2019/0325163 | A1* | 10/2019 | Sharad | G06F 21/6227 |
| 2020/0410228 | A1* | 12/2020 | Wang | G06V 10/82 |
| 2021/0056404 | A1* | 2/2021 | Goswami | G06F 18/22 |
| 2021/0124919 | A1* | 4/2021 | Balakrishnan | G06F 21/44 |

OTHER PUBLICATIONS

Gjomemo et al., "Digital Check Forgery Attacks on Client Check Truncation Systems," International Conference on Financial Cryptography and Data Security, 2014, p. 3-20 (Year: 2014).*
Papernot et al., "Distillation as a Defense to Adversarial Perturbations against Deep Neural Networks", arXiv preprint arXiv: 1511.04508, 2015, p. 1-16 (Year: 2015).*
Dong et al., "Boosting Adversarial Attacks with Momentum", arXiv preprint arXiv:1710.06081, 2017, p. 1-12 (Year: 2017).*
Al-Dujaili, Abdullah, et al., There are no bit parts for sign bits in black-box attacks, arXiv preprint arXiv:1902.06894, 2019.
American Bankers Association, Deposit account fraud survey. 2020. URL https://www.aba.com/news-research/research-analysis/deposit-account-fraud-survey-report.
Carlini, Nicholas, et al., Towards evaluating the robustness of neural networks. In 2017 IEEE symposium on security and privacy (SP), pp. 39-57. IEEE, 2017.
Chen, Pin-Yu, et al., Zeroth order optimization based black-box attacks to deep neural networks without training substitute models, in Proceedings of the 10th ACM Workshop on Artificial Intelligence and Security, pp. 15-26, 2017.
Cohen, Gregory, et al., EMNIST: Extending MNIST to handwritten letters, in 2017, International Joint Conference on Neural Networks (IJCNN), pp. 2921-2926. IEEE, 2017.
Diem, Markus, et al., ICFHR 2014 competition on handwritten digit string recognition in challenging datasets (HDSRC 2014), in 2014 14th International Conference on Frontiers in Handwriting Recognition, pp. 779-784. IEEE, 2014.
Ding, Gavin Weiguang, et al., On the sensitivity of adversarial robustness to input data distributions. In ICLR (Poster), 2019.
Goodfellow, Ian J., et al., Explaining and harnessing adversarial examples. arXiv preprint arXiv:1412.6572, 2014.
Guo, Chuan, et al., Simple black-box adversarial attacks. arXiv preprint arXiv:1905.07121, 2019.
Gupta, Maya R., et al., OCR binarization and image pre-processing for searching historical documents, Pattern Recognition, 40(2):389-397, 2007.
Ilyas, Andrew, et al., Black-box adversarial attacks with limited queries and information, arXiv preprint arXiv:1804.08598, 2018.
Ilyas, Andrew, et al., Prior convictions: Black-box adversarial attacks with bandits and priors, arXiv preprint arXiv:1807.07978, 2018.
Jayadevan, R., et al., Automatic processing of handwritten bank cheque images: a survey. International Journal on Document Analysis and Recognition (IJDAR), 15(4):267-296, 2012.
Kurakin, Alexey, et al., Adversarial examples in the physical world. arXiv preprint arXiv:1607.02533, 2016.
LeCun, Yann, et al., Gradient-based learning applied to document recognition. Proceedings of the IEEE, 86(11):2278-2324, 1998.
LeCun, Yann, et al., MNIST handwritten digit database. 2010.
Lei, Qi, et al., Discrete adversarial attacks and submodular optimization with applications to text classification. arXiv preprint arXiv:1812.00151, 2018.
Li, Yandong, et al., Nattack: Learning the distributions of adversarial examples for an improved black-box attack on deep neural networks. arXiv preprint arXiv:1905.00441, 2019.
Madry, Aleksander, et al., Towards deep learning models resistant to adversarial attacks. arXiv preprint arXiv:1706.06083, 2017.
Moon, Seungyong, et al., Parsimonious black-box adversarial attacks via efficient combinatorial optimization. arXiv preprint arXiv:1905.06635, 2019.
Moosavi-Dezfooli, Seyed-Mohsen, et al., Deepfool: a simple and accurate method to fool deep neural networks. In Proceedings of the IEEE conference on computer vision and pattern recognition, pp. 2574-2582, 2016.
Mor, Noam, et al., Confidence prediction for lexicon-free OCR. In 2018 IEEE Winter Conference on Applications of Computer Vision (WACV), pp. 218-225. IEEE, 2018.
Papernot, Nicolas, et al., The limitations of deep learning in adversarial settings. In 2016 IEEE European symposium on security and privacy (EuroS&P), pp. 372-387. IEEE, 2016.
Rauber, Jonas, et al., Foolbox: A python toolbox to benchmark the robustness of machine learning models. arXiv preprint arXiv:1707.04131, 2017.
Schmidt, Ludwig, et al., Adversarially robust generalization requires more data. arXiv:1804-11285v2 [cs.LG] May 2, 2018.
Shott, Lukas, et al., Towards the first adversarially robust neural network model on MNIST. arXiv preprint arXiv:1805.09190, 2018.
Smith, Ray, An overview of the Tesseract OCR engine. In Ninth International Conference on Document Analysis and Recognition (ICDAR 2007), vol. 2, pp. 629-633. IEEE, 2007.
Song, Congzheng, et al., Fooling OCR systems with adversarial text images. arXiv preprint arXiv:1802.05385, 2018.
Szegedy, Christian., et al., Intriguing properties of neural networks. arXiv preprint arXiv:1312.6199, 2013.
Tu, Chun-Chen, et al., Autozoom: Autoencoder-based zeroth order optimization method for attacking black-box neural networks. In Proceedings of the AAAI Conference on Artificial Intelligence, vol. 33, pp. 742-749, 2019.
Al-Dujaili, Abdullah, et al., Adversarial Deep Learning for Robust Detection of Binary Encoded Malware, arXiv:1801.02950v3, [cs.CR] 7 pages, Mar. 25, 2018.
International Preliminary Report on Patentability in PCT/US2021/016787, dated Jul. 28, 2022, 7 pages.
Office Action in CA3170146, dated Sep. 19, 2023, 7 pages.
Office Action in JP2022-547100, dated Nov. 13, 2023, 10 pages.

* cited by examiner

*Fig. 6C*

DETECTION AND MITIGATION OF CYBER ATTACKS ON BINARY IMAGE RECOGNITION SYSTEMS

CROSS-REFERENCE TO RELATED APPLICATIONS

This application is related to and claims priority to U.S. Provisional Patent Application No. 62/971,021, which was filed Feb. 6, 2020. The disclosure of the Provisional Patent Application is hereby incorporated by reference in its entirety and for all purposes.

FIELD

This present disclosure relates generally, but not exclusively, to optimizing detection and identification of attackable parameters in images that are associated with a cyber-attack on an imaging system.

BACKGROUND

In recent years, there has been an overwhelming interest in understanding the vulnerabilities of artificial intelligence (AI) systems. For example, attacks on image classification models have demonstrated several weaknesses that AI systems need to address. Such attacks distort images in a manner that is virtually imperceptible to the human eye and cause conventional image classification systems to misclassify these images. Practically, these vulnerabilities can lead to serious disasters, such as widespread financial fraud.

Although there has been a great deal of work on securing AI classification models for colored and grayscale images, little is known about attacks on models for binary images, especially in the check scanning industry. Without this knowledge of attacks, there is not much to do to prevent them. By way of example, a spoofing attack is when a malicious party impersonates another device or user on a network in order to launch attacks against network hosts, steal data, bypass access controls, and so on. In general, spoofing attacks distort images in a manner that is imperceptible to the human eye and causes conventional models to misclassify these images. Spoofing attacks on image classification models of colored and grayscale images rely on hiding noise in distorted images by making minor perturbations in the color values of each pixel. Because of these known vulnerabilities, conventional methods can be used to prevent them.

In contrast to attacks on colored and grayscale images, the search space of the attacks on binary images is extremely restricted and noise cannot be hidden with minor perturbations in each pixel. Since each pixel of the binary image can only be black or white, the optimization landscape of attacks on binary images introduces new fundamental challenges to the spoofing attack.

It is not possible to trivially tweak attacks on colored and grayscale images to work on binary images. As described, for grayscale and colored images, minor perturbations can be made to each individual pixel (both in order to estimate what changes need to be made and to limit changes to those that are imperceptible to the human eye) when generating an attack. These minor perturbations are on the order of magnitude of 1/255 to 10/255. For binary images, these minor perturbations cannot be made to a pixel—since it is either black or white (e.g., a 1 or 0), any change is a change of exactly 1. This is an order of magnitude greater than the perturbations relied on to attack colored and greyscale images and cannot translate to an attack on a binary image. Thus, an attack on a binary image is more difficult and thus very little research has been expended on the problem. However, this lack of research does not make this area of image recognition safe from exploits. And conventional AI systems cannot detect what they do not know.

In view of the foregoing, a need exists for an improved system and method for detection and mitigation of cyber-attacks on binary image recognition systems in an effort to overcome the aforementioned obstacles and deficiencies of conventional cyber-attack detection models.

BRIEF DESCRIPTION OF THE SEVERAL VIEWS OF THE DRAWINGS

FIG. 6C illustrates an exemplary spoofing attack on handwritten numbers that can be mitigated with the model security system of FIG. 1 in accordance with one embodiment.

Figure 1:
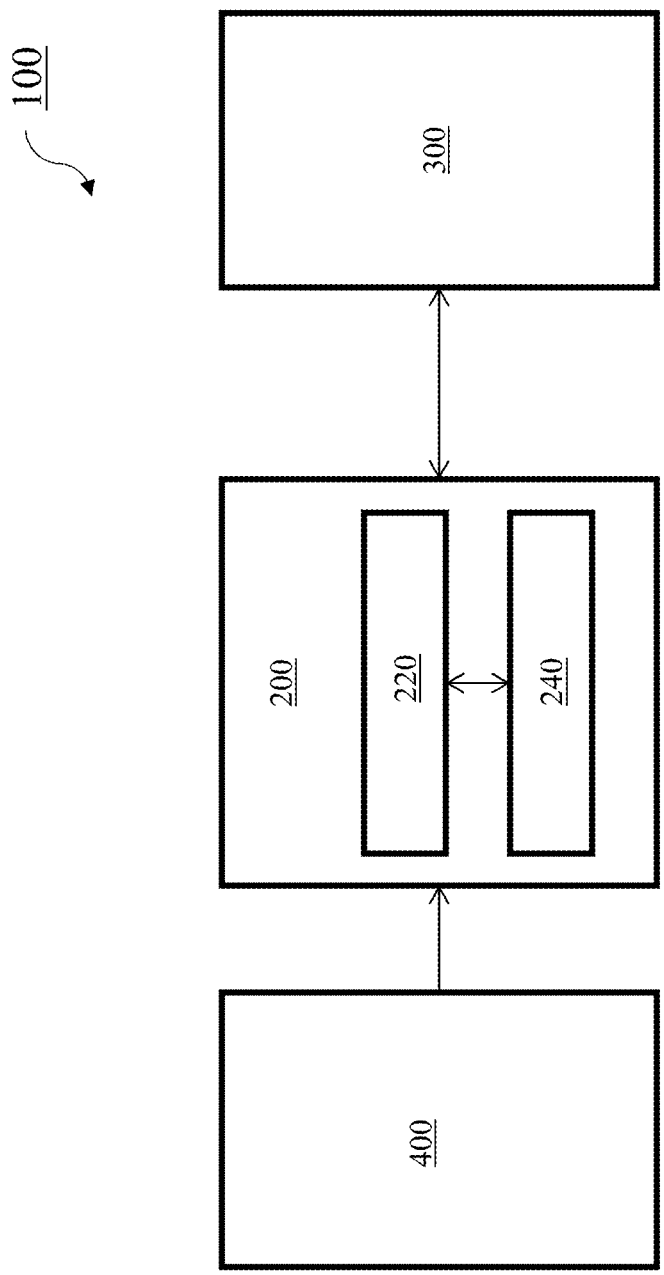
FIG. 1 is an exemplary top-level diagram illustrating one embodiment of a model security system for mitigating cyber-attacks on binary image recognition systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Because currently-available cyber-attack detection and mitigation systems cannot adapt to attacks on models for binary image classification, a system and method is disclosed that identifies binary images that are modified or corrupted in a manner that may cause an image recognition system to register a false result based on the image recognition tools training set. The present solution advantageously reduces false results that would not trigger a rejection of a check when a human manually reviews the check.

The system and method disclosed herein advantageously leverages an understanding of how a binary image classification model can be compromised or spoofed and allow design of a machine learning solution that can trained to defend various image recognition systems. An additional solution to this problem is explained by a testing regime for testing, fortifying, and protecting existing image scanning systems.

The present subject matter can help provide an additional solution to this problem by protecting existing systems without an extensive update of the existing image recognition systems. This can be achieved, for example, by inserting a validation process which sits on top of an existing image recognition system, such as shown in FIG. 1.

Turning to FIG. 1, a schematic diagram of a model security system 200 for securely deploying an AI model 300 in an AI operation environment 100 is shown. The AI model 300 can include one or more computer-implemented mathematical algorithms that are trained using data and/or human expert input to replicate, based upon information, a decision that an expert would make when provided that same information. An exemplary AI model 300 can include, but is not limited to, expert systems, case based reasoning, behavior based artificial intelligence, evolutionary computation, classifiers, a statistical model, a probabilistic model, a neural network, a decision tree, a hidden Markov model, a support vector machine, fuzzy logic, a Bayesian classifier, and the like, or any combination thereof.

The model security system 200 is shown as including a red teaming engine (or model assessment engine) 220 and a firewall 240. The red teaming engine 220 can be configured to identify one or more deficiencies (and/or vulnerabilities) of the AI model 300. Stated somewhat differently, the red teaming engine 220 can determine data that can attack the AI model 300. Attacking the AI model 300 can include deceiving the AI model 300, such as spoofing described above. Stated somewhat differently, attacking can include tricking the AI model 300 into making a decision that is erroneous, that recognizes fraudulent data as non-fraudulent data, that recognizes synthetic (or fabricated, or manipulated) data as authentic data, and a combination thereof. An attack can include data configured to attack the AI model 300. In one embodiment, the red teaming engine 220 can output a report summarizing vulnerabilities of the AI model 300.

The firewall 240 can protect the AI model 300 from being deceived by external data 400 based upon the deficiencies identified by the red teaming engine 220. The external data 400 can include any data that would be inputted into the AI model 300 if the firewall 240 is not established. Stated somewhat differently, the firewall 240 can patch loopholes identified by the red teaming engine 220 to create an additional layer of security that stands between the external data 400 and the AI model 300. In some embodiments, the firewall 240 can generate an alert upon detecting an attack in the external data 400.

In some embodiments, the model security system 200 can be at least partially driven by an application programming interface (API) and be inserted into a data feed of the external data 400 preceding the AI model 300. The model security system 200 can return and/or output data that is clean and free of exploitation to the AI model 300. In various embodiments, the AI model 300 can be untouched and/or unaltered. Advantageously, the model security system 200 can protect the AI model 300 without an extensive update of the AI model 300.

Although FIG. 1 shows the red teaming engine 220 and the firewall 240 as being separate units for illustrative purposes only, the red teaming engine 220 and the firewall 240 can be at least partially integrated and/or combined, without limitation. For example, the red teaming engine 220 and the firewall 240 can each be implemented on computer hardware, firmware and/or software. Accordingly, the red teaming engine 220 and the firewall 240 can be implemented as coded instruction stored on one or more computer systems. The coded instruction associated with the red teaming engine 220 and the firewall 240 can be of separate and/or integrated programs, and the red teaming engine 220 and the firewall 240 are not necessarily implemented on separate hardware.

Figure 2:
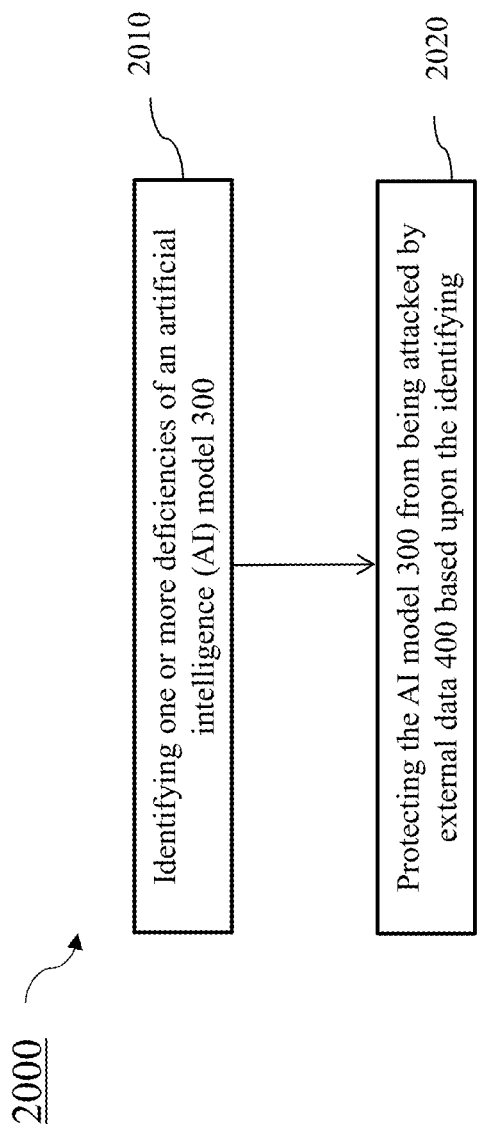
FIG. 2 is a flow chart illustrating one exemplary embodiment of a method for securely deploying the AI model of the binary image recognition system using the model security system of FIG. 1.

Turning to FIG. 2, an exemplary method 2000 for securely deploying the AI model 300 is shown. One or more deficiencies of the AI model 300 can be identified at step 2010. In various embodiments, the red teaming engine 220 (shown in FIG. 1) can implement the step 2010.

The AI model 300 can be protected, at step 2020, from being attacked by the external data 400 (shown in FIG. 1) based upon the identified deficiencies of the AI model 300 (at step 2010). In various embodiments, the firewall 240 (shown in FIG. 1) can implement the step 2020. The protection of the firewall 240 advantageously can be customized for the AI model 300 and thus be effective. As described herein, the model security system 200 is particularly suited to protect and mitigate attacks on binary image classification models.

In some embodiments, binary images are defined as d-dimensional images such that each pixel of the image has an assigned value (e.g., a 0 or 1). The pixel is either black (e.g., defined by value 0) or white (e.g., defined by value 1). For example, in some embodiments herein, the system assumes an m-class classifier that maps a binary image to a probability distribution $F(x) [0, 1]^m$ where $F(x)_i$ corresponds to the confidence or probability that image x belongs to class i. The predicted label y of x is the class with the best confidence, i.e., $y = \arg\max_i F(x)_i$. Examples of binary image processing systems include check processing, license plate recognition, receipt processing, insurance document extraction, and legal document text recognition and compare systems. These binary image processing systems can rely on models to classify binary images, such as the AI model 300 shown in FIG. 1.

In some embodiments, optical character recognition (OCR) systems convert images of handwritten or printed text to electronic strings of characters. They have many important applications, including automatic processing of receipts, passport recognition, insurance document extraction, and license plate recognition. Typically, some OCR systems—such as Tesseract—perform a preprocessing step to convert the input to a binary format.

Binary Attack

To formalize the problem of attacking the AI model 300, for example, of a binary OCR system, a classifier F for OCR where the labels are strings of characters is used herein. Given a binary image x with label y, the system produces an adversarial example x' which is visually similar to x, but has a predicted label y' that is substantively different from the expected outcome y. In other words, y'≠y.

For example, given an image x of a license plate 23FC6A, the system can produce a similar image x' that is recognized as a different valid license plate number. The system can then measure the similarity of the adversarial image x' to the original image x with a perceptibility metric $D_x(x')$. For binary images, a natural metric is the number of pixels where x and x' differ, which corresponds to a $L_0$ distance between the two images. The $L_0$ distance, which typically measures distance between two input images (e.g., represented as matrices) by counting the number of elements (e.g., pixels) that are different, and can be formulated as:

$$\|x-x'\|_0 = \Sigma_i(x_i \neq x'_i)$$

Finding an adversarial example can thus be formulated as the following optimization approach:

$$\min_{\substack{x' \in \{0,1\}^d \\ \|x-x'\|_0 \leq k}} F(x')_y$$

where k is the maximum dissimilarity tolerated for adversarial image x'. In some embodiments, the maximum dissimilarity is bound by k to ensure that the distance between x and x' is not too large. Setting a maximum tolerance of k ensures that the adversarial image x' is still close to the original image x in $L_0$ space. For targeted attacks with target label $y_t$, the system can maximize $F(x')$ $y_t$.

Check processing systems. A check processing system accepts as input a binary image x of a check and outputs confidence scores F(x) which represent the most likely values for what is written on the check (Courtesy Amount Recognition (CAR) and Legal Amount Recognition (LAR)).

Figure 3:
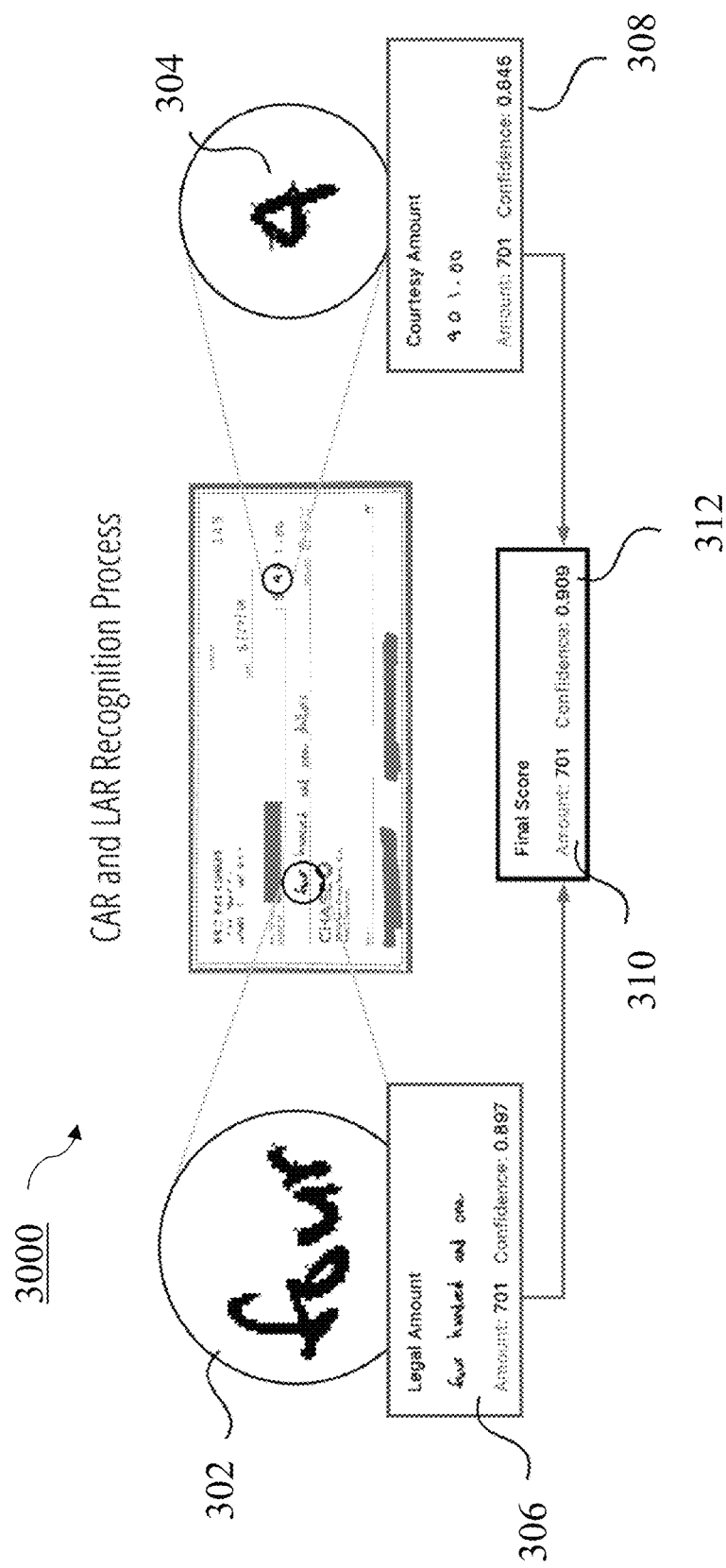
FIG. 3 illustrates an exemplary attack on an image recognition process that can be detected with the binary image recognition system of FIG. 1 in accordance with one embodiment.

FIG. 3 demonstrates a typical image recognition process 3000, for example, while processing a spoofed check and determining the false CAR and LAR amounts. A CAR portion 308 classifies the numerical amount 304 written in numbers; a LAR portion 306 classifies the narrative amount 302 written in words. The scanning process generates a confidence factor for each portion of the CAR 308 and LAR 306. Most conventional scanning systems resolve this to a combined amount value 310 and combined recognition confidence value 312. This is also generally where most commercial systems stop their validation inquiry.

Check processing systems are a unique variant of image recognition systems that use two independent models that verify each other. A model $F_C$ for Courtesy Amount Recognition (CAR) classifies the amount written in numbers, while a distinct model $F_L$ for Legal Amount Recognition (LAR) classifies the amount written in words. If the predicted labels of the two models on an input check image do not match, the check is flagged and is not processed further. Alternatively, if the two values match, the check is processed. For example, if the CAR 304 of a valid check reads "100" and the LAR 302 of the same check reads "one hundred", the values match and the check is processed. One challenge with attacking check processing systems over an input x is to craft an adversarial example x' with the same target label for both $F_C$ and $F_L$. Returning to the previous example, a successful adversarial check image might have the CAR read "900" and the LAR read "nine hundred"—otherwise the check would be flagged because the values do not match. For this targeted attack, the corresponding optimization problem is:

$$\max_{\substack{x' \in \{0,1\}^d \\ y_t \neq y}} F_C(x')_{y_t} + F_L(x')_{y_t}$$

$$\text{subject to } y_t = \operatorname{argmax}_i F_C(x')_i$$
$$y_t = \operatorname{argmax}_i F_L(x')_i$$
$$\|x - x'\|_0 \leq k$$

For this targeted attack, the attacker may attempt to spoof a target amount $y_t$ different from the true amount y, and then attack $F_C$ and $F_L$ such that both misclassify x' as amount $y_t$. Since check processing systems also flag checks for which the models have low confidence in their predictions, the attacker can maximize both the probabilities $F_C(x')y_t$ and $F_L(x')y_t$. In order to have x' look as similar to x as possible, the attacker must also limit the number of modified pixels to be at most a predetermined number k. Many check processing systems are configured such that $F_C$ and $F_L$ only output the probabilities for a limited number of their most probable amounts. This limitation makes the attackers' task of selecting a target amount challenging, as aside from the true amount, the most probable amounts for each of $F_C$ and $F_L$ may be disjoint sets.

Another limitation is that the attacker will not have any information about the model F that is used and can only observe its outputs. In other words, the attacker only has access to the output probability distributions of a model F over queries x'.

Figure 4:
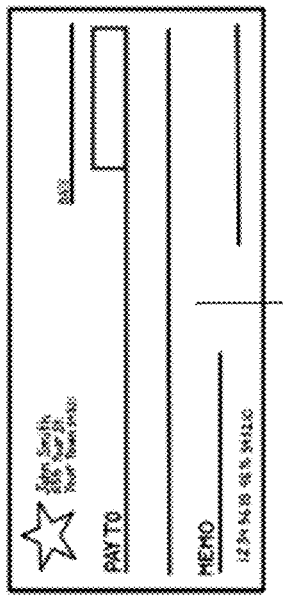
FIG. 4 illustrates an exemplary check spoofing attack that can be detected with the model security system of FIG. 1 in accordance with one embodiment.
Figure 4:
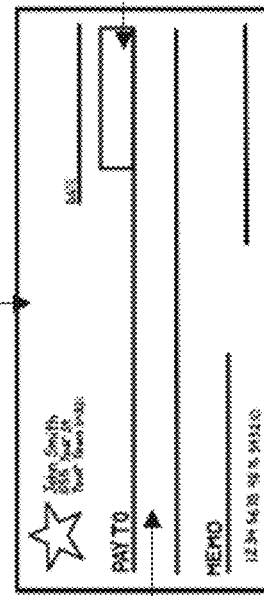

In FIG. 4, a check spoofing attack 4000 comprises a digital image of a check 402 that is subjected to an attack alteration of the number and the text Line 404 (CAR and LAR), which substitutes a digital image of an altered check 406, possessing an altered CAR 408, and an Altered LAR 410. This creates an adversarial model spoofing attack which modifies the digital image of the check 402 in a manner that is imperceptible to the human eye, but creates a model error to the benefit of the attacker and can be detected and mitigated by the model security system 200.

Figure 5:
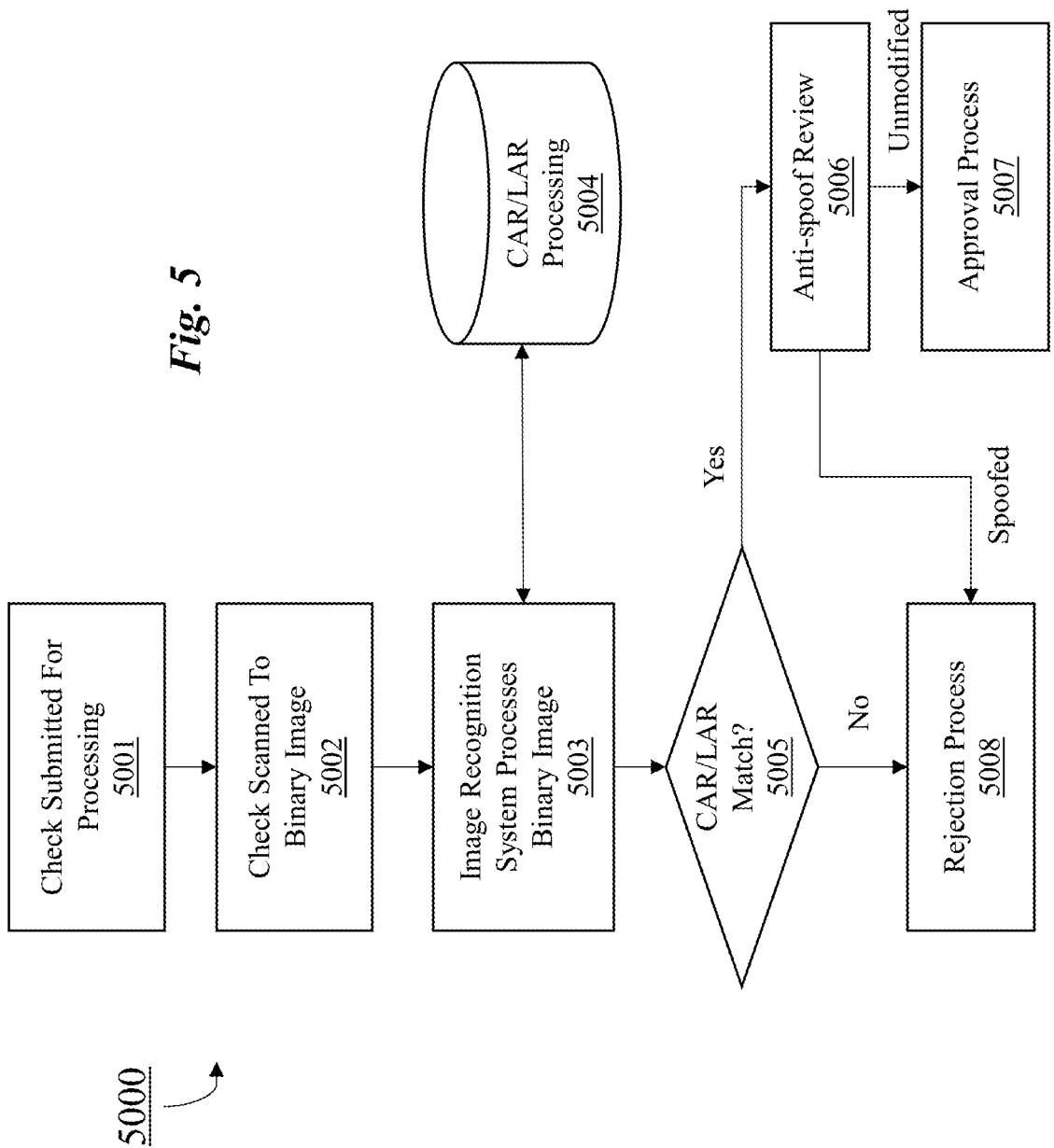
FIG. 5 illustrates an exemplary check submission process that can be mitigated with the model security system of FIG. 1 in accordance with one embodiment.

FIG. 5 shows an exemplary data flow diagram of a check submission process 5000 that can be used with the systems and methods described herein. Turning to FIG. 5, the check submission process 5000 begins when a check is submitted for processing at 5001. The check is then scanned to generate a binary image of the check at 5002. Once in its binary form, an image recognition system (not shown) can process the binary image, such as described above with reference to FIG. 3, at 5003. For example, in some embodiments, a check processing system accepts as input a binary image x of a check and outputs confidence scores F(x) which represent the most likely values for what is written on the check (Courtesy Amount Recognition (CAR) and Legal Amount Recognition (LAR)), at 5004. As previously described, the image recognition system then determines whether the identified CAR and LAR values match, at 5005.

In some embodiments, the scanning process generates a confidence factor for each portion of the CAR 308 and LAR 306 (shown in FIG. 3) which is then resolved to a final score.

While conventional scanning systems resolve this to a combined amount value 310 and combined recognition confidence value 312 and stop their validation inquiry, the model security system 200 can then perform an anti-spoof review, at 5006. In other words, the model security system 200 intercepts any CAR/LAR images that have been spoofed, for example, using the targeted attack described herein, at 5006.

In some embodiments, the anti-spoof review comprises two sub methods working in parallel. First, an image-based method includes training a machine learning model (e.g., such as the AI model 300). The machine learning model can receive the raw check image as input and classify whether it is spoofed or not. Training the model comprises a data generation step and model training step. The data generation step includes the methods described herein to generate a predetermined number of spoofed images at scale. The model training step comprises implementing one or more computer vision classification algorithms to train the machine learning model to classify whether a check is spoofed or not, training over non-spoofed checks as well as the spoofed checks generated as described herein. By way of example, the vision classification algorithms can include one or more convolutional neural networks applied to analyze visual imagery.

Typically, blackbox attacks require querying the check processing system frequently. Accordingly, the firewall 240 monitors the inputs to the check processing system over time and identifies when a sequence of inputs may be part of an adversarial attack.

During each stage of the anti-spoof review 5006 and the determination that a sequence of inputs is part of an adversarial attack, a score is produced for each input. A meta model takes the predictions of the two individual models and combines them into a single score. Compared to a single model, these two models have different strengths and weaknesses that complement each other. For example, monitoring queries is particularly suited for detecting and preventing black box attacks that can advantageously prevent an attack before an adversarial example is identified. If fraudsters limit the number of queries (e.g., through a transfer attack), then the machine learning model can better identify the attack.

If the model security system 200 determines that the binary image has been tampered with in the manner described herein, the altered check image is prevented from advancing to the approval process, at 5007, and rejected at 5008.

Attacking a Binary Image

As described above, the model security system 200 can detect and mitigate a number of attacks on image classification models. Exemplary attacks are described that can be detected by the model security system 200. Although two variations are described for exemplary purposes only, it is understood that the system can perform and detect any combination of methods to address the issues of hiding noise in binary images and optimizing the number of queries.

A simplified version of a combinatorial attack on a binary image x which is classified as true label, y, by a model F and described as Algorithm 1 is shown. At each iteration, Algorithm 1 finds the pixel p in the input image x such that flipping $x_p$ to the opposite color causes the largest decrease in F(x'), which is the confidence that this perturbed input x' is classified as the true label y. In other words, the system flips this pixel and repeats this process until either the classification of the perturbed input is y'≠y or the maximum $L_0$-distance k with the original image is reached. In Algorithm 1 below, x'+$e_p$ represents the image x' with pixel p flipped.

---
Algorithm 1
---
input model F, image x, label y
   x' ← x
   while y = arg max$_i$ F(x')$_i$ and ‖x' − x‖$_0$ ≤ k do
      p' ← argmin$_p$ F(x' + $e_p$)$_y$
      x' ← x + $e_{p'}$
   return x'

---

Algorithm #1

The adversarial images x' produced by Algorithm 1 can successfully fool models 300 and have small $L_0$ distance to the original image x. However, the noise added to the inputs can still be visible to the human eye and the number of queries to the model needed to produce an adversarial example is large.

Hiding the Noise

As previously described, for attacks on colored or grayscale images, the noise is often imperceptible because the change to any individual pixel is small relative to the range of possible colors.

For each pixel in a binary image, any attack can only invert its color or leave it untouched. Thus, small changes in the color of each pixel are not possible and gradient-based techniques cannot be applied. A noisy pixel (i.e., a pixel with inverted color, whose color is different relative to its neighboring pixels) is highly visible because their colors contrast with that of their neighboring pixels. Algorithm 1 flips the color of only a small number of pixels, which results in noise with small $L_0$ distance, but the noisy pixels are very visible.

To address this issue, a new constraint is introduced that only allows modifying pixels on the boundary of black and white regions in the image. A pixel is on a boundary if it is white and at least one of its eight neighboring pixels is black (or vice-versa). Adversarial examples produced under this constraint have a greater $L_0$ distance to their original images, but the noise is significantly less noticeable.

Optimizing the Number of Queries

An attack may be computationally expensive if it requires many queries to a black-box model. For paid services where a model is hidden behind an application programming interface (API), running attacks can be financially costly as well. Several works have proposed techniques to reduce the number of queries required for a successful attack. Many of the prior solutions are based on gradient estimation and therefore do not apply in the binary setting.

Two optimization techniques are introduced to exploit correlations between pixels both spatially and temporally across iterations. For each iteration, at point x', the gain from flipping pixel p is defined as the following discrete derivative of F in the direction of p:

$$F(x')_y - F(x' + e_p)_y$$

A pixel has large gain if this value is larger than a threshold τ. That is, if flipping the pixel p results in a decrease in the model confidence of label y by an amount greater than t, the pixel has large gain.

Spatial Correlations

Figure 9:
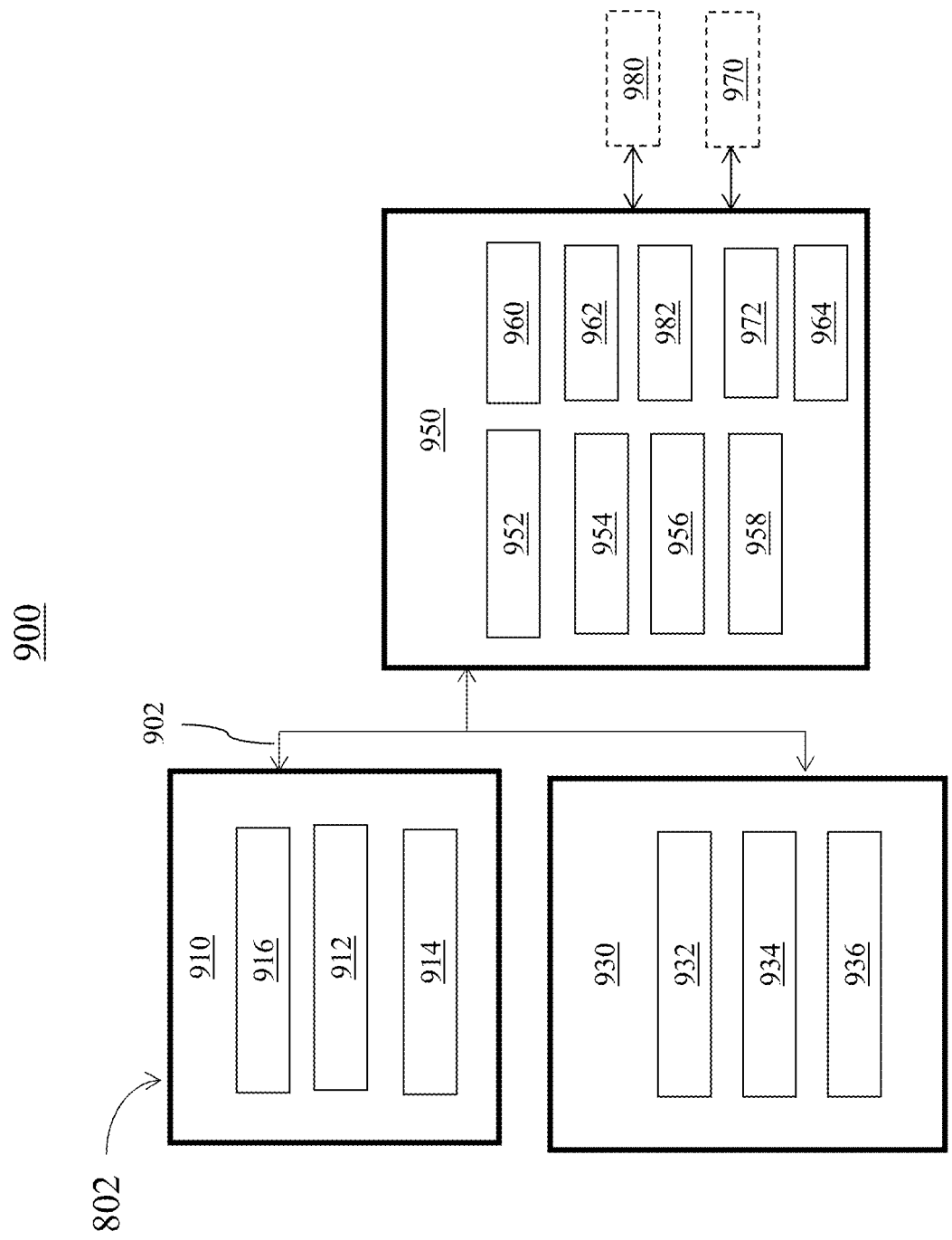
FIG. 9 is a diagram illustrating an exemplary embodiment of a machine for implementing the model security system of FIG. 1.

The first modification that can be detected by the model security system 200 is based on exploits to the spatial correlations between pixel gains. Pixels in the same spatial regions are likely to have similar discrete derivatives, such as shown in FIG. 9. At every iteration, an attacker would prioritize evaluating the gains of the eight pixels N(p) neighboring the pixel p which was modified in the previous iteration of the algorithm. If one of these pixels has large gain, then the attacker would flip it and proceed to the next iteration without evaluating the remaining pixels.

Temporal Correlations

The second modification that can be detected by the model security system 200 is based on exploits to the correlations between the gains from a pixel p across different iterations. Pixels with large discrete derivatives at one iteration are more likely to have large discrete derivatives in the next iteration compared to other pixels.

At each iteration, an attacker must first consider pixels which had large gain in the previous iteration. If one of these pixels continues to produce large gain in the current iteration, it is flipped and the system proceeds to the next iteration without evaluating the remaining pixels. This process ignores pixels which have a low impact toward misclassification across many iterations.

SCAR

A more detailed method for attacking binary images of Algorithm 1 and that can be mitigated by the model security system 200 is described in Algorithm 2. In order to improve on the number of queries, Algorithm 2 prioritizes evaluating the discrete derivatives of pixels which are expected to have large gain according to the spatial and temporal correlations described above.

If one of these pixels has large gain, then it is flipped and the remaining pixels are not evaluated. If none of these pixels have large gain, an attacker would then consider all pixels on the boundary B(x) of black and white regions in the image x. In this set, the pixel with the largest gain is flipped regardless of whether it has gain greater than T.

As before, the standard basis vectors in the direction of coordinate i with $e_i$. The gain of each pixel with vector g is monitored and maintained. In some embodiments, algorithm 2 represents a Shaded Combinatorial Attack on Recognition systems (SCAR):

---

Algorithm 2 SCAR, Shaded Combinatorial Attack on Recognition sytems.

input model F, image x, label y, threshold $\tau$, budget k
  x' ← x, g ← 0
  while y = arg max$_i$ F(x')$_i$ and $\|x' - x\|_0 \leq$ k do
    for p : $g_p \geq \tau$ or N(p) do
      $g_p$ ← F(x')$_y$ − F(x' + $e_p$)$_y$
    if max$_p$ $g_p$ < $\tau$ then
      for p ∈ B(x') do
        $g_p$ ← F(x')$_y$ − F(x' + $e_p$)$_y$
    p' ← arg max$_p$ $g_p$
    x' ← x + $e_{p'}$
  return x'

---

Algorithm 2 is an untargeted attack which finds an adversarial example x' which is classified as label y'≠y by F. It can easily be modified into a targeted attack with target label $y_t$ by changing the first condition in the while loop from y=arg max$_i$ F(x')$_i$ to $y_t$≠arg max$_i$ F(x')i, and by computing the gains $g_p$ as F(x+$e_i$)$y_t$−F(x)$_y$ instead of F(x)$_y$−F(x+$e_i$)$_y$.

Simultaneous Attacks

There are two significant challenges to attacking check processing systems. In the previous section, the challenge caused by preprocessing check images into binary images was introduced. The second challenge is that check processing systems employ two independent models which verify the output of the other model: $F_C$ classifies the amount written in numbers, and $F_L$ classifies the amount written in letters. Motivated by this, an algorithm which tackles the problem of attacking two separate OCR systems simultaneously is introduced.

In some embodiments, the model security system 200 understands when attacks search for a target amount at the intersection of what $F_C$ and $F_L$ determines are probable amounts. However, on unmodified checks, the models 300 are often highly confident of the true amount, and other amounts have extremely small probability, or do not even appear at all as predictions by the models.

To increase the likelihood of choosing a target amount which will result in an adversarial example, an untargeted attack on both $F_C$ and $F_L$ using SCAR, which returns image $x^u$ with reduced confidence of the true amount y is initiated. Then, the target amount to be the amount $y_t$ with the maximum value min ($F_C(x^u)i, F_L(x^u)i$) is chosen, since the goal is to attack both $F_C$ and $F_L$. A targeted version of SCAR (T-SCAR) is implemented twice to perform targeted attacks on both $F_C$ and $F_L$ over image $x^u$. This is formalized as Algorithm 3 below.

---

Algorithm 3 input check image x, models $F_C$ and $F_L$, label y
  $x_C$, $x_L$ ← extract CAR and LAR regions of x
  $x_C^u$, $x_L^u$ ← SCAR ($F_C$, $x_C$), SCAR ($F_L$, $x_L$)
  $y_t$ ← max$_{i \neq y}$ min ($F_C(x_C^u)_i$, $F_L(x_L^u)_i$)
  $x_C'$, $x_L'$ ← T-SCAR($F_C$, $x_C^u$, $y_t$), T-SCAR($F_L$, $x_L^u$, $y_t$)
  x' ← replace CAR, LAR regions of x with $x_C'$, $x_L'$
  return x'

---

Algorithm 3

With reference to the example check shown in FIG. 3, Algorithm 3 can be used to attack the check, for example, written in the amount of $401. As shown, Algorithm 3 can be implemented to misclassify with high confidence (0.909) the amount as $701 by using the conventional CAR/LAR recognition processing used by many financial institutions. The model security system 200 can determine if Algorithm 3 has been used to modify the binary image of the check.

FIGS. 6A-E illustrate a series of exemplary attacks that can be detected by the model security system 200 on a convolutional neural network (CNN) (e.g., the model 300) trained over various data sets. In each exemplary figure, the original image is shown on the left and the various outputs of the attacks described herein are shown on the right. The attacks shown on the right do not necessarily represent a progression of attacks; but rather independent attacks and are shown for exemplary purposes only.

Figure 6A:
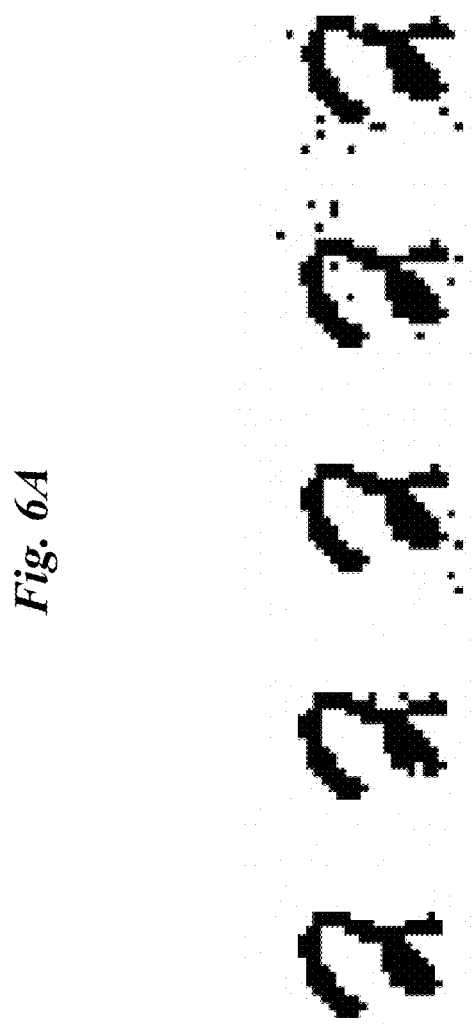
FIG. 6A illustrates an exemplary spoofing attack on a character that can be mitigated with the model security system of FIG. 1 in accordance with one embodiment.

FIG. 6A describes a spoofing attack on a numerical character using different algorithms as defined above: from left to right (classification): original (2), SCAR(7), VANILLA-SCAR(7), POINTWISE(8); SIMBA(7). The numbers in the parentheses following the type of attack represents the falsely determined result of the image recognition process. For example, the second image has been attacked using the SCAR algorithm described above and has spoofed the value of "7"

Figure 6B:
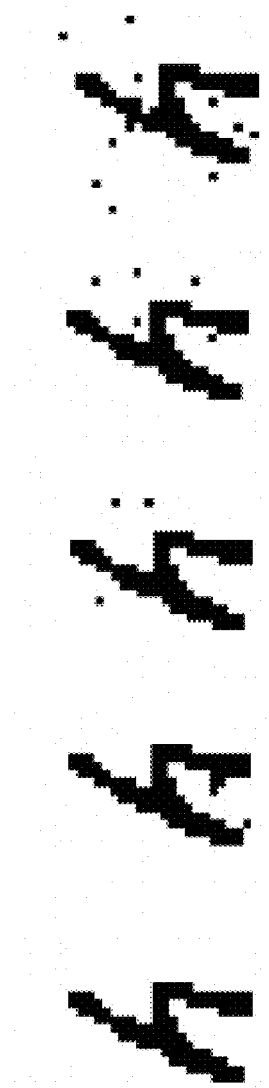
FIG. 6B illustrates an exemplary spoofing attack on a character that can be mitigated with the model security system of FIG. 1 in accordance with another embodiment.

FIG. 6B describes a spoofing attack on a text character using different algorithms from left to right (classification): original (8), SCAR(3), VANILLA-SCAR(3), POINTWISE (2); SIMBA(5).

Figure 6C:
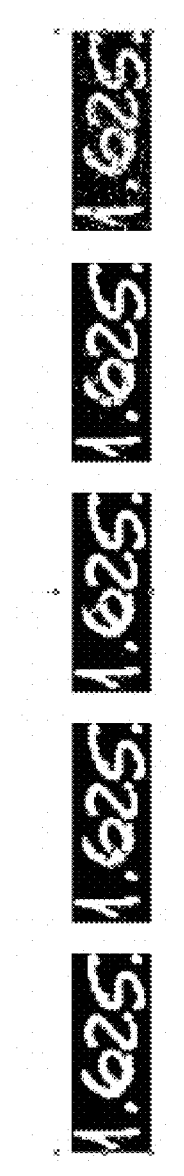

FIG. 6C describes a spoofing attack on a multi-digit number character using different algorithms: from left to right (classification): original (1625); SCAR (15625); SimBA (1025); Vanilla SCAR (10625); POINTWISE (1025).

Figure 6D:
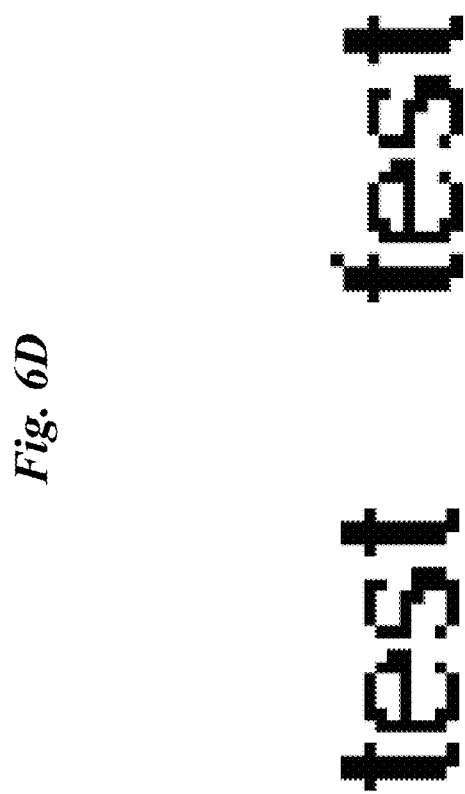
FIG. 6D illustrates an exemplary spoofing attack on a typed word that can be mitigated with the model security system of FIG. 1 in accordance with one embodiment.

FIG. 6D describes a spoofing attack on a multi-letter word using different algorithms: from left to right: original (test); SCAR (fest).

Figure 6E:
FIG. 6E illustrates an exemplary spoofing attack on a typed word that can be mitigated with the model security system of FIG. 1 in accordance with another embodiment.

FIG. 6E describes a spoofing attack on a multi-letter word using different algorithms: from left to right: original (down); SCAR (dower).

Four Attack Methodologies

Four attack methods are compared: SCAR, VANILLA-SCAR, SIMBA, and POINTWISE.

SCAR, which is Algorithm 2 with threshold $\tau=0.1$.

VANILLA-SCAR, which is Algorithm 1. SCAR is compared to Algorithm 1 to demonstrate the importance of hiding the noise and optimizing the number of queries.

SIMBA, which is Algorithm 1 in with the Cartesian basis and $\varepsilon=1$. SIMBA is an algorithm for attacking (colored) images in black-box settings using a small number of queries. At every iteration, it samples a direction q and takes a step towards $\varepsilon$ q or $-\varepsilon$ q if one of these improves the objective. In the setting where q s sampled from the Cartesian basis and $\varepsilon=1$, SIMBA corresponds to an $L_0$ attack on binary images which iteratively chooses a random pixel and flips it if doing so results in a decrease in the confidence of the true label.

Pointwise first applies random salt and pepper noise until the image is misclassified. It then greedily returns each modified pixel to their original color if the image remains misclassified.

Metrics

To evaluate the performance of each attack A over a model F and test set X, three metrics can be used. These metrics advantageously indicate the vulnerability of the system/model to such attacks.

The success rate of A is the fraction of images x 2 X for which the output image x0=A(x) is adversarial, i.e., the predicted label $y_0$ of $x_0$ is different from the true label y of x. Only images x which are initially correctly classified by F are attacked.

The $L_0$ distance is used to measure how similar an image x'=A(x) is to the original image x, which is the number of pixels where x and x' differ.

The number of queries to model F to obtain output image x'=A(x).

The distance constraint k. Because the image dimension d differs for each experiment, a principled approach to selecting the maximum $L_0$ bound k. For an image x with label y, the $L_0$ constraint is:

$$k = \alpha \cdot \frac{\mathcal{F}(x)}{|y|}$$

where F(x) counts the number of pixels in the foreground of the image, $\alpha \varepsilon |0, 1|$ is a fixed fraction and |y| is the number of characters in y (e.g., |23FC6A|=6). In other words, k is a fixed fraction of the average number of pixels per character in x. In some embodiments, $\alpha=1/5$.

Tesseract Attack Example

The vulnerability of OCR systems concerns not only handwritten text, but also printed text, which one might expect to be more robust. This vulnerability is described in the context of English words and show that in many cases, a change in a single pixel suffices for a word to be misclassified by a popular open-source text recognition system as another word in the English dictionary with a different semantic meaning.

The Tesseract model. Tesseract is an open-source text recognition system designed for printed text. Tesseract 4 is based on a long short-term memory (LSTM) model, which is an artificial recurrent neural network (RNN) architecture for deep learning. The system takes as input an image that is first segmented into images of each line. Tesseract binarizes input images as part of the preprocessing. Each line is then processed by the LSTM model which outputs a sequence of characters.

The dataset. Images of a single printed English word can be tested by the system over the version of Tesseract trained for the English language. In some embodiments, words of length four in the English language were chosen at random. The accuracy rate over 1000 such images was 0.965 with an average confidence among words correctly classified as 0.906. Among those that are correctly classified by Tesseract, 100 random words can be selected to attack. In some cases, especially images with a lot of noise, Tesseract does not recognize any word and rejects the input. Since the goal of these attacks is to misclassify images as words with a different meaning than the true word, an attack is only considered to be successful if the adversarial image produced is classified as a word in the English dictionary.

Figure 7:
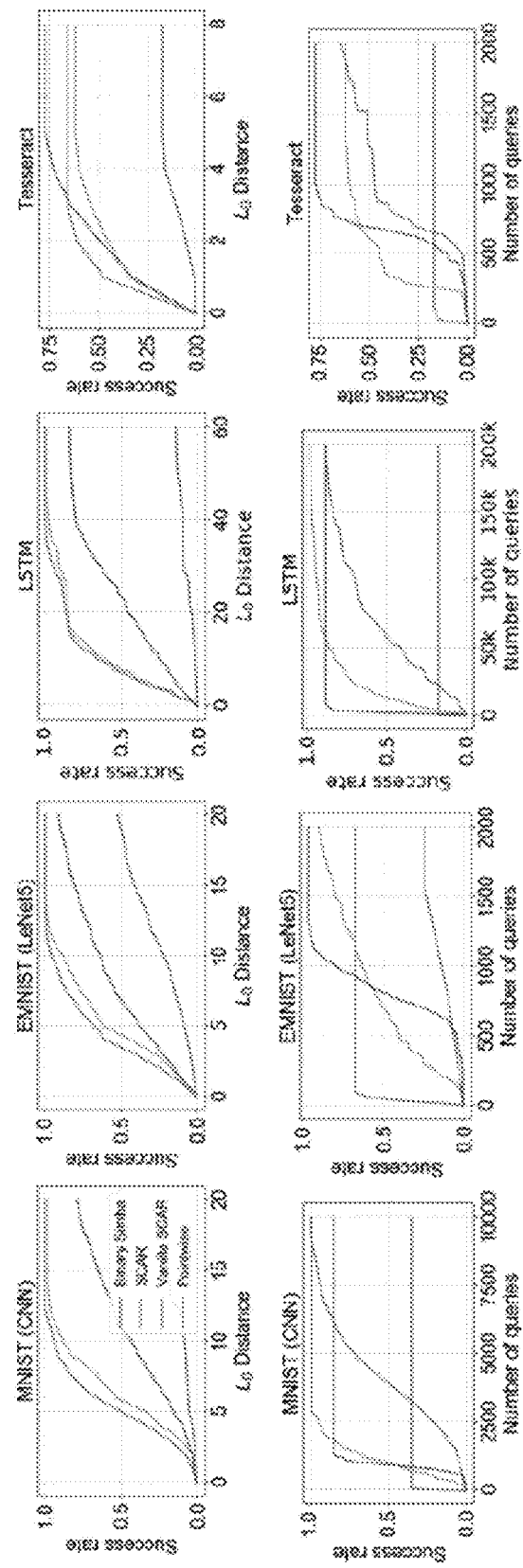
FIG. 7 illustrates an exemplary success rate comparison based on $L_0$ distance and number of queries for a neural network model by various attack algorithms that can be mitigated with the model security system of FIG. 1 in accordance with one embodiment.

FIG. 7 shows an outcome graphics of attacks. Success rate by $L_0$ distance and by number of queries for a CNN model trained over MNIST, a LeNet5 model trained over EMNIST, an LSTM model on handwritten numbers, and Tesseract model over printed words.

Figure 8:
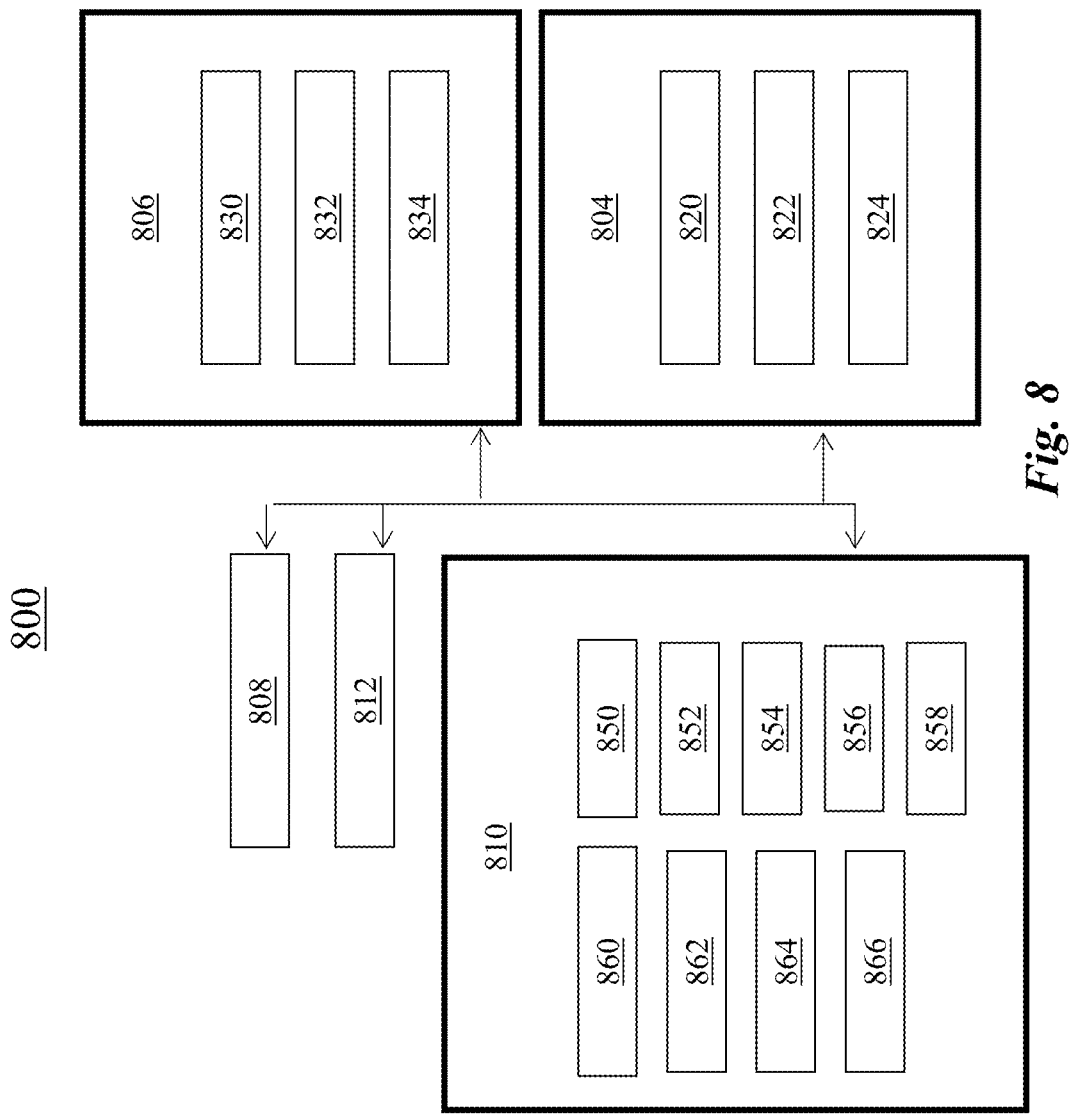
FIG. 8 is a diagram illustrating an exemplary embodiment of a software architecture for implementing the model security system of FIG. 1.

FIG. 8 is a block diagram illustrating a software architecture 800, which can be installed on any one or more of the devices described herein. FIG. 8 is merely a non-limiting example of a software architecture, and it will be appreciated that many other architectures can be implemented to facilitate the functionality described herein. In various embodiments, the software architecture 800 is implemented by hardware such as a machine 900 of FIG. 9.

In this example architecture, the software architecture 800 can be conceptualized as a stack of layers where each layer may provide a particular functionality. For example, the software architecture 800 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods of FIG. 2 or FIG. 5. Additionally, or alternatively, the instructions 916 may implement any of the features described with reference to FIGS. 1 and 3-4. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" can be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magnetooptical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Embodiments of this solution may be implemented in one or a combination of hardware, firmware and software. Embodiments may also be implemented as instructions stored on a computer-readable storage device, which may be read and executed by at least one processor to perform the operations described herein. A computer-readable storage device may include any non-storing information in a form readable by a machine (e.g., a computer). For example, a computer-readable storage device may include read-only memory (ROM), random-access memory (RAM), magnetic disk storage media, optical storage media, flash-memory devices, cloud servers or other storage devices and media. Some embodiments may include one or more processors and may be configured with instructions stored on a computer-readable storage device. The following description and the referenced drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

In some cases, implementations of the disclosed technology include a system configured to utilize machine learning algorithms to identify potentially altered binary image data submitted to an image recognition system. In some embodiments, a binarization defense system utilizes machine-learning, and may leverage human interactions/review of suspected patterns to help teach the defense algorithms and improve detection of other defects.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including"

and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computer-implemented method for detecting vulnerabilities of a model for binary image classification, comprising:

receiving, by a computer system, a binary image data, the computer system configured to detect a pixel value in the binary image data to represent a non-machine language value related to the binary image data;

determining, by the computer system, that the binary image data further comprises at least a pixel value that is altered in a manner to change the non-machine language value related to the binary image data when read by an image recognition system; and alerting, by the computer system, to the image recognition system to review the binary image data, wherein the image recognition system includes:
  a first artificial intelligence model that classifies a first portion of the binary image data that represents a numerical amount written in numbers; and
  a second artificial intelligence model that classifies a second portion of the binary image data that represents the numerical amount written in letters;

wherein said determining includes determining that the first and second artificial intelligence models are attacked simultaneously such that the changed non-machine language value associated with the first portion matches the changed non-machine language value associated with the second portion when read by the image recognition system, and wherein said determining that the first and second artificial intelligence models are attacked simultaneously comprises determining that an untargeted attack using a shaded combinatorial attack on recognition systems is used on at least one of the first and second artificial intelligence models, wherein the shaded combinatorial attack includes one or more iterations, at least one of the iterations including evaluating gains of one or more pixels of the binary image data based upon spatial and temporal correlations among the gains of the pixels across the iterations.

2. The computer-implemented method of claim 1, wherein the at least one of the iterations further includes:
  determining whether a selected pixel of the pixels has a gain greater than a threshold; and
  at least one of flipping the selected pixel or flipping a pixel on a boundary of black and white regions of the binary image data that is associated with the largest gain among all pixels on the boundary, based upon said determining whether the selected pixel has the gain greater than the threshold.

3. The computer-implemented method of claim 2, further comprising determining whether a target version of the shaded combinatorial attack on recognition systems was implemented twice to attack both of the first and second artificial intelligence models.

4. One or more non-transitory computer readable media comprising instructions that, when executed with a computer system configured to review binary, cause the computer system to at least:

receive, by the computer system, a binary image data, the computer system configured to detect a pixel value in the binary image data to represent a non-machine language value related to the binary image data;

determine, by the computer system, that the binary image data further comprises at least a pixel value that is altered in a manner to change the non-machine language value related to the binary image data when read by an image recognition system; and alert, by the computer system, to the image recognition system to review the binary image data, wherein the image recognition system includes:

a first artificial intelligence model that classifies a first portion of the binary image data that represents a numerical amount written in numbers; and a second artificial intelligence model that classifies a second portion of the binary image data that represents the numerical amount written in letters;

wherein said determining includes determining that the first and second artificial intelligence models are attacked simultaneously such that the changed non-machine language value associated with the first portion matches the changed non-machine language value associated with the second portion when read by the image recognition system, and wherein said determining that the first and second artificial intelligence models are attacked simultaneously comprises determining that an untargeted attack using a shaded combinatorial attack on recognition systems is used on at least one of the first and second artificial intelligence models, wherein the shaded combinatorial attack includes one or more iterations, at least one of the iterations including evaluating gains of one or more pixels of the binary image data based upon spatial and temporal correlations among the gains of the pixels across the iterations.

5. The non-transitory computer readable media of claim 4, wherein the at least one of the iterations further includes:
determining whether a selected pixel of the pixels has a gain greater than a threshold; and
at least one of flipping the selected pixel or flipping a pixel on a boundary of black and white regions of the binary image data that is associated with the largest gain among all pixels on the boundary, based upon said determining whether the selected pixel has the gain greater than the threshold.

6. The non-transitory computer readable media of claim 5, further comprising determining whether a target version of the shaded combinatorial attack on recognition systems was implemented twice to attack both of the first and second artificial intelligence models.

7. The non-transitory computer readable media of claim 4, wherein the binary image data is at least one of an alphanumerical sequence or a check.

8. The non-transitory computer readable media of claim 4, wherein the image recognition system is an optical character recognition system.

9. A computer-implemented method for determining vulnerabilities of a model for binary image classification, comprising:
receiving, by a computer system, a binary image data, the computer system configured to test a set of pixel values in the binary image data to represent a non-machine language value related to the binary image data in an image recognition system;
determining, by the computer system, that the binary image data further comprises at least a pixel value is altered in a manner to change the non-machine language value related to the binary image data when read by the image recognition system; and
alerting, by the computer system, that the image recognition system is vulnerable to a spoofing attack,
wherein the image recognition system includes:
a first artificial intelligence model that classifies a first portion of the binary image data that represents a numerical amount written in numbers; and
a second artificial intelligence model that classifies a second portion of the binary image data that represents the numerical amount written in letters;
wherein said determining includes determining that the first and second artificial intelligence models are attacked simultaneously such that the changed non-machine language value associated with the first portion matches the changed non-machine language value associated with the second portion when read by the image recognition system, and
wherein said determining that the first and second artificial intelligence models are attacked simultaneously comprises determining that an untargeted attack using a shaded combinatorial attack on recognition systems is used on at least one of the first and second artificial intelligence models, wherein the shaded combinatorial attack includes one or more iterations, at least one of the iterations including evaluating gains of one or more pixels of the binary image data based upon spatial and temporal correlations among the gains of the pixels across the iterations.

10. The computer-implemented method of claim 9, wherein the at least one of the iterations further includes:
determining whether a selected pixel of the pixels has a gain greater than a threshold; and
at least one of flipping the selected pixel or flipping a pixel on a boundary of black and white regions of the binary image data that is associated with the largest gain among all pixels on the boundary, based upon said determining whether the selected pixel has the gain greater than the threshold.

11. The computer-implemented method of claim 10, further comprising determining whether a target version of the shaded combinatorial attack on recognition systems was implemented twice to attack both of the first and second artificial intelligence models.

12. The computer-implemented method of claim 9, wherein the binary image data is an alphanumerical sequence.

13. The computer-implemented method of claim 9, wherein the image recognition system is an optical character recognition system.

14. The computer-implemented method of claim 9, wherein the binary image data is a check.

* * * * *